Jan. 31, 1956  F. H. OSBORNE  2,732,787
BEVERAGE INFUSER
Filed Feb. 26, 1953

INVENTOR
FAY H. OSBORNE,
BY *James N. Graves*
ATTORNEY

United States Patent Office 2,732,787
Patented Jan. 31, 1956

2,732,787

BEVERAGE INFUSER

Fay Herman Osborne, Windsor Locks, Conn.

Application February 26, 1953, Serial No. 339,063

3 Claims. (Cl. 99—306)

This invention relates to a new and improved apparatus for the production of water infusions or extracts of coffee, tea and the like, and is more particularly concerned with an apparatus specifically designed for making water infusions or extracts from small, individual-service coffee bags of the type wherein a unit quantity of ground or pulverized coffee is packed in small, porous bags, usually made from special type tissue filter paper, the quantity of ground coffee enclosed in each bag being just sufficient to make a single cup of coffee.

Individual-service tea bags of the foregoing general character have been in vogue and general use for many years, and their use has grown in popularity tremendously in the last decade or two due to the convenience and simplicity of making water infusions or extracts from these bags by merely steeping the same in a cup of boiling water and then disposing of the bag after infusion.

Individual-service coffee bags of this type are now also being manufactured and sold on the open market. Some of the advantages attending the use of tea bags are also found in the use of these individual-service coffee bags, such as the accurately weighed ground-coffee content of the bag and the comparative ease of disposal of the bag with its grounds, all as compared with the conventional coffee-brewing process employing comparatively complicated apparatus, hit-and-miss measuring of coffee and the messy disposal of the grounds. In other words, it is much more convenient merely to place the coffee bag in a cup, pour boiling water over the bag, allow extraction to take place for several minutes with occasional stirring, and then removing and disposing of the bag. However, there are many inherent disadvantages attending the current practice of brewing coffee from these coffee bags by direct infusion in the individual cup. Among these disadvantages the following may be enumerated:

1. Coffee extracted in this manner is extremely cloudy and contains considerable sediment. This is because the tissue paper forming the bag must, of necessity, be very porous to permit proper infusion. On the other hand, however, the coffee contained within the bag is very finely ground, and the fines are so small that they pass through the interstices of the porous bag. This is particularly true when the brew is stirred during infusion. Aside from giving the ultimate brew a cloudy appearance, these fines give the brewed coffee a bitter taste.

2. The extract prepared by infusion in the individual cup is lacking in strength and aroma. Even though rather large amounts of coffee are used in each bag, experience has shown that it is difficult to obtain the desired strength, color and aroma by simple hot water infusion with the bag in the cup.

3. After the infusion or extract is completed in the cup, and the bag is removed from the infusion, the problem of disposal of the bag is rather serious. In preparing tea infusions with the conventional individual tea bag, it is customary to place the spent bag in the saucer. This practice is rather difficult with the spent coffee bag since a coffee bag is comparatively large, containing about four times as much coffee as there is tea in a tea bag, and for that reason, the bulk of the coffee bag is much larger than the bulk of a tea bag. Because of this inordinate bulk, it is most difficult to place the used coffee bag in the rim of a saucer without having a large portion of the bag hanging over the rim. As a matter of fact, the spent bag will drip on the tablecloth or even fall off of saucer entirely. The individual-service coffee bag is simply too big and cumbersome for infusion brewing directly in the cup.

4. Because the coffee bag is so large, actually displacing much of the water in the cup, and because it soaks up so much of the water employed for infusing, much less than a full cup of extract is left in the individual cup when the spent bag is removed.

5. Because of the comparative weakness of the brew resulting from simple infusion in the individual cup, the infusion process is economically unsatisfactory.

6. Because the coffee bag is left in an open cup, it is therefore exposed to room temperature, and the infusion immediately becomes cooled with a consequent loss of aroma.

A prime object of the invention is to provide a simple but efficient infusion apparatus in which all of the foregoing disadvantages are obviated when brewing coffee from individual-service coffee bags.

Another object is to provide an apparatus for producing a crystal-clear infusion of coffee, which is free from all cloud occasioned by the presence of fine grounds.

A further object of the invention is to provide an apparatus for the brewing of coffee from bags of this type which will result in a full cup of brewed coffee of full strength and having maximum aroma.

A still further object of the invention is to provide a simple apparatus for brewing coffee from individual-service coffee bags wherein the bag disposal problem is entirely obviated.

A further object is to provide a brewing apparatus particularly adapted for the preparation of coffee extracts or infusions in which said extract or infusion is prepared in a more economical manner.

Other objects will become apparent as the description of the infusing apparatus proceeds.

Reference is now made to the accompanying drawings in which like reference characters denote like parts and in which Fig. 1 is a vertical section of the apparatus partly in elevation;

Figure 1:
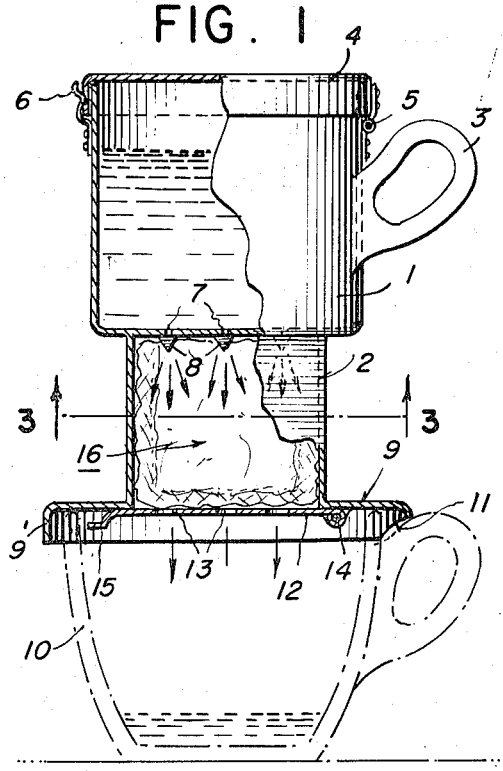
Figure 3:
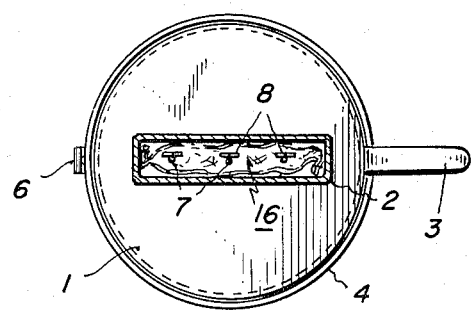
Fig. 3 is a transverse section of the apparatus taken on line 3—3 of Fig. 1 looking in the direction of the arrows.

In the drawings, the infusing apparatus of the present invention consists essentially of two main elements, namely, a hot water reservoir 1 and a depending infusing chamber 2. Hot water reservoir 1 is preferably cylindrical in cross section, as shown, and is provided with a handle 3 and a flanged cover 4. This cover 4 is hinged as at 5 and is adapted to be snapped and held in a closed position by means of a conventional spring snap 6. The reservoir is designed to hold approximately 250 cubic centimeters of water.

The bottom surface of hot water reservoir 1 is provided with a multiplicity of very fine openings or apertures 7 through which the hot water is allowed to pass by gravity into an infusion chamber 2. Preferably there are three aligned openings or apertures 7 each having a diameter of the order of 0.04 inch. Apertures 7 are placed on a diameter of the bottom of reservoir 1 over the center of depending infusion chamber 2. Depending from the bottom of the hot water reservoir, at points immediately adjacent apertures 7, are drip directing means 8. These drip directing means 8 may be of any desired configuration, such as small triangles, as shown. The purpose of these drip directing means is to direct the hot water through apertures 7 in such a fashion that it passes directly on to the coffee bag in the infusing chamber 2. In other words, these drip directing means prevent a wicking action down the side of the bag and down the sides of the infusion chamber. This is one salient feature of the invention.

Infusion chamber 2 depends from hot water reservoir 1 and is positioned directly under apertures 7. The shape of the infusing chamber is substantially that of a parallelepiped of such shape and size that it will hold therein, in snug fit, the conventional rectangular coffee bag. Preferably the infusing chamber is about two inches high, about two and one-quarter inches wide and about three quarters of an inch thick. The essential feature of the infusing chamber is that it will snugly accommodate the conventional coffee bag and hold the same "on end" so that hot water from reservoir 1 will pass through all of the coffee in the bag in a lengthwise direction.

At the bottom of the infusing chamber 2 there is provided a circular base 9 having a depending flange 9', the configuration being such that the base and flange will fit conveniently over the rim of conventional cup 10, as illustrated in Fig. 1. Conveniently, base 9 is about four inches in diameter and flange 9' depends downwardly about one quarter inch. The outer periphery of base 9 is cut away, for a distance of about three quarters of an inch, as at 11, so that said base will be accommodated on cups of various sizes and will not interfere with the conventional handle of the cup.

In the center of base 9 there is provided a gate 12, with aligned perforations 13 through which the infusion passes on its way to the cup. These perforations 13 are considerably larger than apertures 7 because, of necessity, they must be large enough to permit the brew to pass rapidly from infusion chamber 2 to cup 10 just as fast as the infusion is formed. There must be no back-up of the infusion in chamber 2. Perforations 13 are preferably three in number and each is approximately one-sixteenth of an inch in diameter. It will be noted that gate 12 is constantly urged toward closed position by spring hinge 14 of conventional design. The gate is also provided with a finger piece 15 by means of which the gate may be opened.

Figure 4:
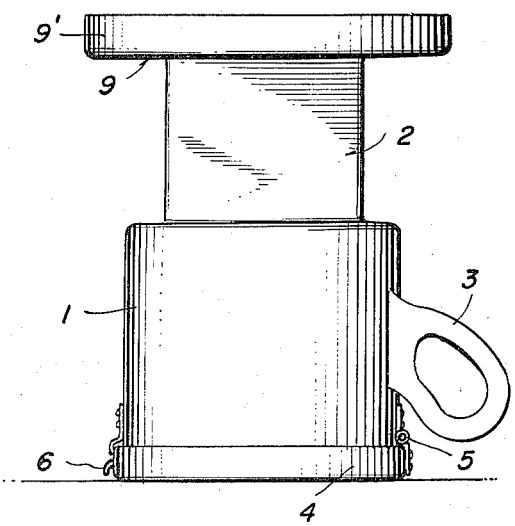
Fig. 4 is a side elevation of the apparatus shown in Fig. 1 but wherein the apparatus is shown in upside-down position.
Figure 2:
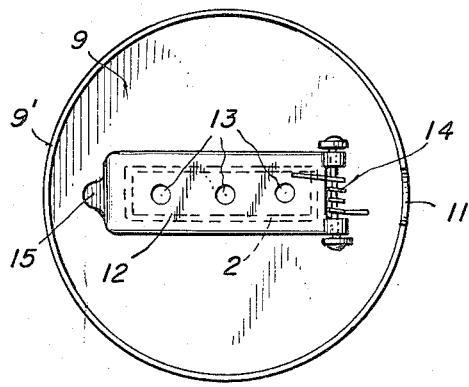
Fig. 2 is a bottom view of the apparatus shown in Fig. 1.
Figure 5:
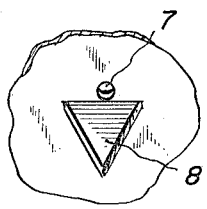
Fig. 5 is a detail of the drip-directing means shown in Fig. 1.

In use, the infusing apparatus is turned upside-down, as shown in Fig. 4, perforated gate 12 opened against the spring action of hinge 14 and a coffee bag 16 inserted on end into infusing chamber 2. Gate 12 is then allowed to close and the infusing apparatus turned over and placed on the rim of a cup as shown in Fig. 1. Cover 4 is then opened and the desired quantity of boiling water is added to the reservoir 1. The amount of boiling water added depends somewhat on the size of cup 10 and the strength of brew desired. This is essentially from 200 to 250 cubic centimeters. Apertures 7 are of such size and number that this amount of hot water will flow downwardly through coffee bag 16, from one edge thereof to the other, within four or five minutes. At the end of this time, when the water in reservoir 1 has all passed through apertures 7 and seeped down through the coffee in the bag, the infuser is grasped by handle 3, tipped over, and placed upside-down on the table as shown in Fig. 4. In this way, any dripping from the bag will be caught in cover 4.

After the infusion is made, perforated gate 12 is opened, the spent coffee bag picked out of infusion chamber 2 and discarded. The infuser can then be rinsed and be ready for use again. It should be pointed out that the infuser can be employed several times before scouring is necessary.

Other attempts have been made to provide infuser apparatus for preparing brewed coffee from so-called coffee cartridges. In these prior art infusers however, these cartridges were laid on their side in the infuser and hot water allowed to pass therethrough in the smallest dimension of the bag. Therefore, the hot water was in contact with the coffee for a relatively short period. On the other hand, in the apparatus of the invention, hot water is allowed to pass through the large dimension of the bag and is therefore in contact with the coffee a much longer time. Moreover, and this is another salient feature of the invention, by designing the infusion chamber of such configuration that it snugly accommodates the bag in end-on-end position so that water passes through the bag from edge to edge in its largest dimension, the ground coffee acts as a filter, in effect, preventing practically all of the fines from passing through into the cup.

It has been determined by actual test experiment, that the extracts made by employing the apparatus of the invention are superior to those extracts obtained by merely placing a coffee bag in an individual cup and then pouring hot water over the bag. In an actual quantative determination, the extract made with a coffee bag in the cup had 0.4514 grams of sediment whereas, a bag of the same size and containing the same amount of coffee, when brewed in the apparatus of the invention, produced a sediment of only 0.0163 grams. In other words, there was approximately twenty-eight times as much sediment in the brew prepared by infusion directly in the cup as compared with a brew prepared using the apparatus of the invention.

In the same comparative test, the strength of the extract, after removing the sedmiment, and as measured on an electric colorimeter, showed a color of 440 for the extract prepared in accordance with the invention, and 355 for the extract when the bag was used directly in the cup. This means that there is an increase of some 24% in the strength in the extract made when using the present apparatus as compared with the extract made with the bag in the cup. The reason for this increase in coffee infusion strength is that in the apparatus of the invention, the ground coffee is being leached continuously by fresh hot water all of the time, while, in the case of the coffee bag in the cup, just as soon as any appreciable coffee is leached out, the extract itself retards the solubility of the coffee remaining in the bag. In other words, by the old method, the solubility rate is continuously slowed down as the concentration of the extract increases.

It is obvious that the problem of disposing of the bag is entirely eliminated when employing the present apparatus. It remains in the apparatus and need not be removed until desired. Moreover, it need not be seen at all while the beverage is being consumed.

It is obvious, moreover, that there will not be any dripping of the saturated, soggy bag on a tablecloth since the bag is always held in the infuser, and if there is any dripping at all, it will be caught in cover 4.

Also, a full cup of coffee can always be obtained by employing a little extra boiling water in reservoir 1 to make up for the amount held back by the bag.

For the duration of the extraction time, the cup 10 is completely covered by cover 8 and the infuser covered by cover 4. Thus, the temperature as well as the aroma is preserved much more than is the case where the infusion is made directly in the individual cup.

Although the foregoing description is directed mainly to the provision of an infusion apparatus designed to brew a single cup of coffee from a single bag, it is obvious that a plurality of cups may be brewed by enlarging all of the component parts of the apparatus and by employing more than one coffee bag. For example, if two cups are desired, the capacity of reservoir 1 will be enlarged to 500 cubic centimeters, infusing chamber 2 will be 1½ inches thick instead of ¾ inch and two coffee bags may be inserted therein end-on-end but side-by-side. Also, a larger container will be provided to catch the brew. Moreover, there would be a row of apertures 7 on each bag.

Although the foregoing description is directed mainly to the provision of an infusion apparatus designed to brew a single cup of coffee from a single bag, it is also obvious that it would be suitable for brewing tea from tea bags or any beverage which can be packaged in infusion bags.

What is claimed is:

1. An infusing apparatus for preparing extracts from small, water-pervious, individual service, rectangular-shaped, substantially flat coffee bags comprising a hot water reservoir of unit beverage cup capacity, an infusing chamber depending from said reservoir and communicating therewith through a multiplicity of fine apertures, said infusing chamber being vertically disposed and generally parallelepiped-shaped to hold a coffee bag of the indicated character snugly suspended on end therein so that water from said reservoir may pass through said apertures and drip by gravity lengthwise through said bag, a base on said infusing chamber adapted to fit over and rest on the rim of a cup, and a perforated, swinging gate in said base which is normally held closed by spring action during infusion but which may be readily opened and closed to charge a fresh bag into said infusing chamber and to remove a spent bag therefrom.

2. An infusing apparatus for preparing extracts from small, water-pervious, individual service, rectangular-shaped, substantially flat coffee bags comprising a hot water reservoir of unit beverage cup capacity, an infusing chamber depending from said reservoir and communicating therewith through a multiplicity of fine apertures, means adjacent said apertures to direct water passing therethrough in a directly downward path, said infusing chamber being vertically disposed and generally parallelepiped-shaped to hold a coffee bag of the indicated character snugly suspended on end therein so that water from said reservoir may pass through said apertures and drip by gravity lengthwise through said bag, a base on said infusing chamber adapted to fit over and rest on the rim of a cup, and a perforated, swinging gate in said base which is normally held closed by spring action during infusion but which may be readily opened and closed to charge a fresh bag into said infusing chamber and to remove a spent bag therefrom.

3. An infusing apparatus for preparing extracts from small, water-pervious, individual service, rectangular-shaped, substantially flat coffee bags comprising a hot water reservoir of unit beverage cup capacity, a cover on said reservoir, an infusing chamber depending from said reservoir and communicating therewith through a multiplicity of fine apertures, means adjacent said apertures to direct water passing therethrough in a directly downward path, said infusing chamber being vertically disposed and generally parallelepiped-shaped to hold a coffee bag of the indicated character snugly suspended on end therein so that water from said reservoir may pass through said apertures and drip by gravity lengthwise through said bag, a base on said infusing chamber adapted to fit over and rest on the rim of a cup, and perforated, swinging gate in said base which is normally held closed by spring action during infusion but which may be readily opened and closed to charge a fresh bag into said infusing chamber and to remove a spent bag therefrom.

References Cited in the file of this patent

UNITED STATES PATENTS

| | | |
|---|---|---|
| Re. 7,883 | Miller | Sept. 11, 1877 |
| 152,309 | Underhill | June 23, 1874 |
| 203,179 | Miller | Apr. 30, 1878 |
| 772,481 | Talbert | Oct. 18, 1904 |
| 1,015,407 | Selg | Jan. 23, 1912 |
| 1,083,900 | Brown | Jan. 6, 1914 |
| 1,335,048 | Diefendorf | Mar. 30, 1920 |
| 1,377,316 | Clermont | May 10, 1921 |
| 1,544,674 | Miller | July 7, 1925 |
| 1,546,434 | Catalano | July 21, 1925 |

FOREIGN PATENTS

| | | |
|---|---|---|
| 461,972 | Canada | Dec. 27, 1949 |